United States Patent
Gretz et al.

(10) Patent No.: US 6,956,170 B1
(45) Date of Patent: Oct. 18, 2005

(54) PREPACKAGED MOUNTING ASSEMBLY

(76) Inventors: Thomas J. Gretz, 1102 Oakmont Rd., Clarks Summit, PA (US) 18411; John Ofcharsky, 625 E. Park St., Olyphant, PA (US) 18447

( * ) Notice: Subject to any disclaimer, the term of this patent is extended or adjusted under 35 U.S.C. 154(b) by 0 days.

(21) Appl. No.: 10/816,518

(22) Filed: Apr. 1, 2004

Related U.S. Application Data

(63) Continuation-in-part of application No. 10/790,793, filed on Mar. 3, 2004, now Pat. No. 6,794,573, which is a continuation-in-part of application No. 10/723,122, filed on Nov. 26, 2003, now Pat. No. 6,777,615, which is a continuation-in-part of application No. 10/464,334, filed on Jun. 18, 2003, now Pat. No. 6,734,356, which is a continuation-in-part of application No. 10/361,292, filed on Feb. 10, 2003, now Pat. No. 6,632,998, which is a continuation-in-part of application No. 10/287,088, filed on Nov. 4, 2002, now Pat. No. 6,646,201, which is a continuation-in-part of application No. 10/012,584, filed on Nov. 7, 2001, now Pat. No. 6,509,524, and a continuation-in-part of application No. 10/017,571, filed on Oct. 22, 2001, now Pat. No. 6,677,523, which is a continuation-in-part of application No. 09/784,981, filed on Feb. 16, 2001, now Pat. No. 6,355,883, and a continuation-in-part of application No. 09/373,431, filed on Aug. 13, 1999, now Pat. No. 6,191,362.

(51) Int. Cl.[7] .................................................. H01H 9/02
(52) U.S. Cl. ............................ 174/58; 174/50; 174/60; 174/135; 220/4.02
(58) Field of Search .............................. 174/58, 50, 63, 174/17 R, 60, 135; 220/3.3, 3.7, 3.8, 3.6, 4.02; 439/535; 248/906

(56) References Cited

U.S. PATENT DOCUMENTS

| | | | | |
|---|---|---|---|---|
| 3,846,604 A | * | 11/1974 | Shallbetter | 200/297 |
| 4,399,922 A | * | 8/1983 | Horsley | 220/3.6 |
| 4,483,453 A | * | 11/1984 | Smolik | 220/3.5 |
| 4,572,391 A | * | 2/1986 | Medlin | 220/3.9 |
| 4,688,693 A | * | 8/1987 | Medlin, Jr. | 220/3.9 |
| 4,880,128 A | | 11/1989 | Jorgensen et al. | |
| 5,407,088 A | | 4/1995 | Jorgensen et al. | |
| 5,762,223 A | | 6/1998 | Kerr, Jr. | |
| 6,207,898 B1 | | 3/2001 | Reiker | |

* cited by examiner

*Primary Examiner*—Dhiru R. Patel

(57) ABSTRACT

A prepackaged mounting assembly for securing a device, such as a ceiling fan, light fixture, or similar device to an overhead beam. The mounting assembly includes an L-shaped mounting box that includes a first and a second junction box. Each junction box includes an integral arcuate flange portion that cooperate to accept a separately supplied bracket thereon. The bracket includes slots therein and the integral flange portion includes downward extending alignment posts to enable easy centering of the bracket under the mounting box and the overhead beam. All hardware required to complete installation of the device is temporarily secured to the L-shaped box for shipment and storage, including an initial fastener and load bearing fasteners. The L-shaped mounting assembly is especially useful for mounting an electrical device to an existing ceiling.

20 Claims, 7 Drawing Sheets

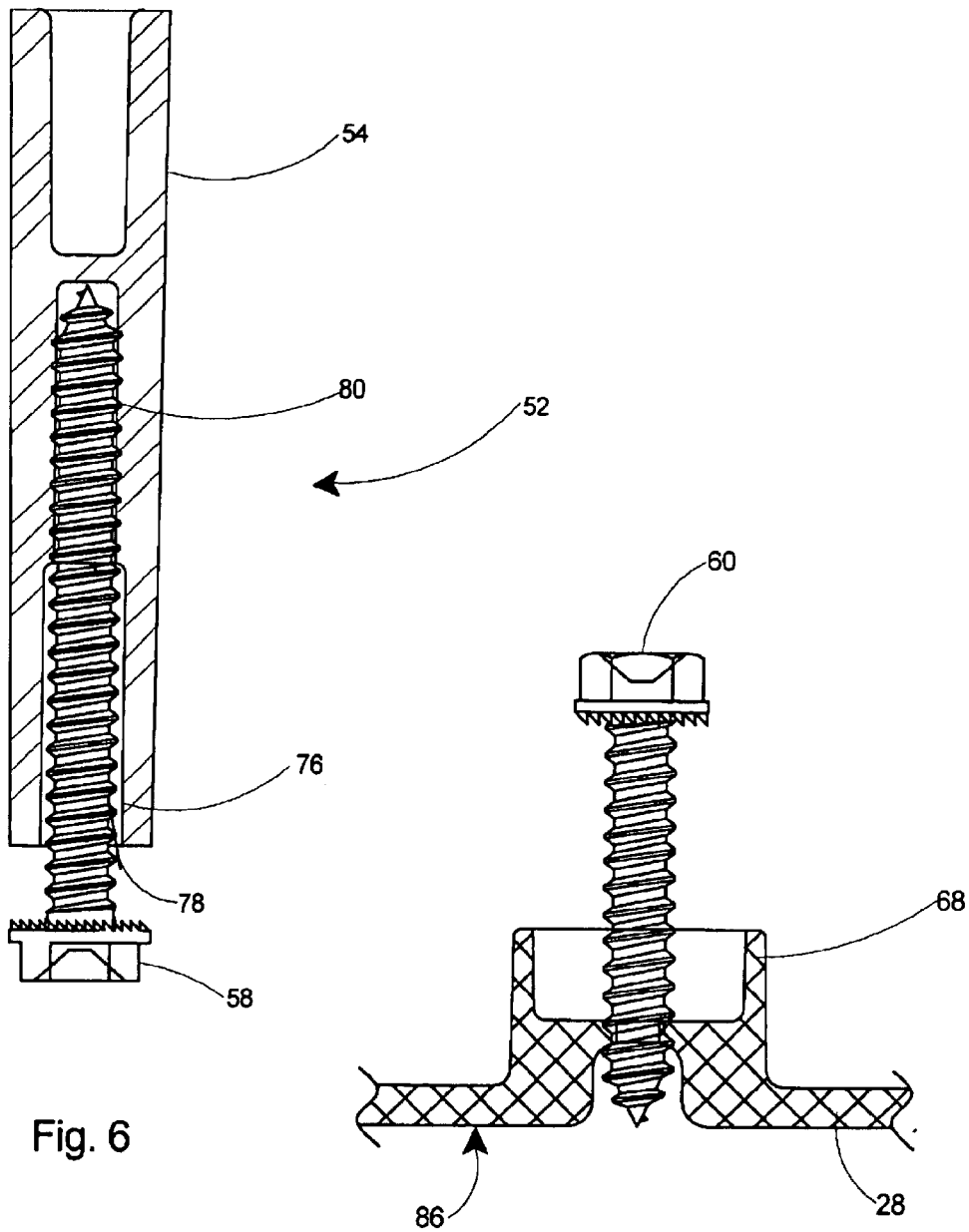

PREPACKAGED MOUNTING ASSEMBLY

This application is a Continuation-In-Part of U.S. patent application Ser. No. 10/790,973 entitled "Prepackaged Mounting Assembly", filed Mar. 3, 2004 now U.S. Pat. No. 6,794,573, which is a Continuation-In-Part of U.S. patent application Ser. No. 10/723,122 entitled "Fan Rated Junction Box Assembly", filed Nov. 26, 2003 now U.S. Pat. No. 6,777,615, which is a Continuation-In-Part of U.S. patent application Ser. No. 10/464,334 entitled Prepackaged Mounting Assembly and Bracket Combination, filed Jun. 18, 2003 now U.S. Pat. No. 6,734,356, which is a Continuation-In-Part of 10/361,292 entitled "Prepackaged Mounting Assembly with Holstered Screws", filed Feb. 10, 2003 now U.S. Pat. No. 6,632,998, which is a Continuation-In-Part of U.S. patent application Ser. No. 10/287,088 entitled "Prepackaged Mounting Assembly", filed Nov. 4, 2002 now U.S. Pat. No. 6,646,201, which is a Continuation-In-Part of U.S. patent application Ser. No. 10/012,584 entitled "Prepackaged Mounting Assembly", filed Nov. 7, 2001, now U.S. Pat. No. 6,509,524, and is a Continuation-In-Part of U.S. patent application Ser. No. 10/017,571 entitled "Electrical Fixture Mounting Box and Mounting Assembly", filed Oct. 22, 2001, now U.S. Pat. No. 6,677,523, which is a Continuation-In-Part of U.S. patent application Ser. No. 09/784,981 entitled "Electrical Fixture Mounting Box and Mounting Assembly", filed Feb. 16, 2001, now U.S. Pat. No. 6,355,883, and is a Continuation-In-Part of U.S. patent application Ser. No. 09/373,431 entitled "Electrical Fixture Mounting Box", filed Aug. 13, 1999, now U.S. Pat. No. 6,191,362, of which all of the above are incorporated by reference herein in their entireties.

FIELD OF THE INVENTION

The present invention relates to mounting assemblies for electrical devices, and more particularly to an L-shaped mounting assembly for securing a device, such as a ceiling fan, light fixture, or similar device to an overhead beam.

BACKGROUND OF THE INVENTION

The present invention expands upon the concept of the prepackaged mounting assembly that is disclosed in and shares inventorship with U.S. Pat. Nos. 6,509,524, 6,632,998, 6,646,201, and 6,677,523 and U.S. application Ser. No. 10/790,973. The prepackaged mounting assemblies disclosed in these patents provide all the hardware needed for attaching a mounting assembly to an overhead beam, including all required fasteners to complete the installation, without the need for an outer wrap or separate packaging to hold the separate components.

In particular, U.S. Pat. No. 6,646,201 provided an L-shaped mounting assembly that provided a large integral internal wiring cavity and also disclosed the use of an initial fastener for use in initially securing the mounting assembly to an overhead beam. By securing with the initial fastener, the installer's hands are advantageously freed to complete the remaining installation steps. Load bearing fasteners, which were held in temporary storage receptacles for shipment and storage, were then removed and driven into permanent receptacles and into the supporting beam to securely attach the L-shaped assembly thereto.

U.S. Pat. No. 6,646,201 included an alternate embodiment of the L-shaped mounting assembly, which was preferred when there was no provision in the mounting assembly for apertures for receipt of the load bearing fasteners or when the manufacturer's bracket included apertures extending beyond the side walls of the mounting assembly. This mounting assembly is installed initially with an initial mounting screw. The load bearing fasteners are then removed from their temporary storage receptacles and installed through the manufacturer's bracket and directly into the overhead beam to secure the assembly thereto. The load bearing fasteners are thereby installed outboard of the side walls of the lower junction box of the L-shaped mounting assembly and extend directly into the overhead beam. By moving the installation point of the load bearing fasteners outboard the side walls of the lower junction box, the alternate embodiment of the L-shaped mounting assembly could be used with virtually any oversized bracket provided separately by manufacturer's, including those for light fixtures, ceiling fans, or similar overhead electrical devices.

Although the alternate embodiment disclosed in U.S. Pat. No. 6,646,201 provided enabled the L-shaped mounting assembly to accommodate an oversize manufacturer's bracket, it was difficult to align the bracket with the mounting assembly and the beam to which it was attached.

To solve the problem of aligning the manufacturer's bracket with the mounting assembly, U.S. application Ser. No. 10/790,973 disclosed an L-shaped mounting assembly that provided an arrangement for aligning a manufacturer's bracket with the mounting assembly for proper installation of load bearing fasteners into the supporting beam. The aligning arrangement included posts extending downwards from a flange on the lower end of the mounting assembly. The manufacturer's bracket, which typically includes longitudinal slots, was simply placed against the flange with the posts extending through the slots.

Although the mounting assembly of U.S. application Ser. No. 10/790,973 provided a means of aligning the bracket with the mounting assembly and the beam, as a result of its oversized junction box, it was especially useful for mounting an electrical device to an unfinished ceiling, in which the beams are bare and exposed or in which the sheet rock has not yet been installed. If the mounting assembly of Ser. No. 10/790,973 were used in a retrofit situation, in which the sheet rock were already installed, it was not easy to form a hole for accepting the mounting assembly without disturbing the surrounding ceiling surface and thereby requiring the installer to repair the surrounding ceiling area.

What is needed therefore is an L-shaped mounting assembly that can be used in a retrofit situation or a situation in which the ceiling has already been finished. The mounting assembly should be capable of being easily installed in a finished ceiling, with minimal disturbance to the surrounding ceiling surface. An adequately sized cavity should be provided for holding wiring connections. The mounting assembly should furthermore have the advantage of providing a mounting structure that is capable of being stored, shipped, and sold as a prepackaged unit with all required fasteners for installation self-contained within the unit. Fasteners should be held securely enough to permit storage, shipping, display and handling without the need for an outer wrap or separate packaging to retain the fasteners with the assembly.

SUMMARY OF THE INVENTION

According to the present invention, there is provided a mounting assembly for securing a device, such as a ceiling fan, light fixture, or similar device to an overhead beam. The mounting assembly includes an L-shaped mounting box that includes a first and a second junction box. Each junction box includes an integral arcuate flange portion that cooperate to accept a separately supplied bracket thereon. The bracket includes slots therein and the integral flange portion includes downward extending alignment posts to enable easy centering of the bracket under the mounting box and the overhead beam. All hardware required to complete installation of the device is temporarily secured to the L-shaped box for shipment and storage, including an initial fastener and load bearing fasteners. The L-shaped mounting assembly is especially useful for mounting an electrical device to an existing ceiling.

At the installation site, a circular hole is made in the sheetrock to expose the overhead beam. The initial fastener, held temporarily in the top of the second junction box, is driven into the overhead beam to hold the mounting assembly to the beam. Wiring connections are then completed in the wiring cavity. The bracket is then easily centered with the mounting box by slipping the bracket onto the alignment posts with the posts extending through the slots of the bracket. The load bearing fasteners are removed from their temporary storage holsters within the first junction box and installed through the bracket exterior of the side walls of the first junction box and into the overhead beam to secure the bracket thereto.

DESCRIPTION OF THE DRAWINGS

FIG. 6 is a sectional view of a holster taken along line 6—6 of FIG. 2 and depicting a load bearing fastener secured temporarily therein.

FIG. 7 is a boss detail including an initial mounting fastener.

TABLE OF NOMENCLATURE

Figure 1:
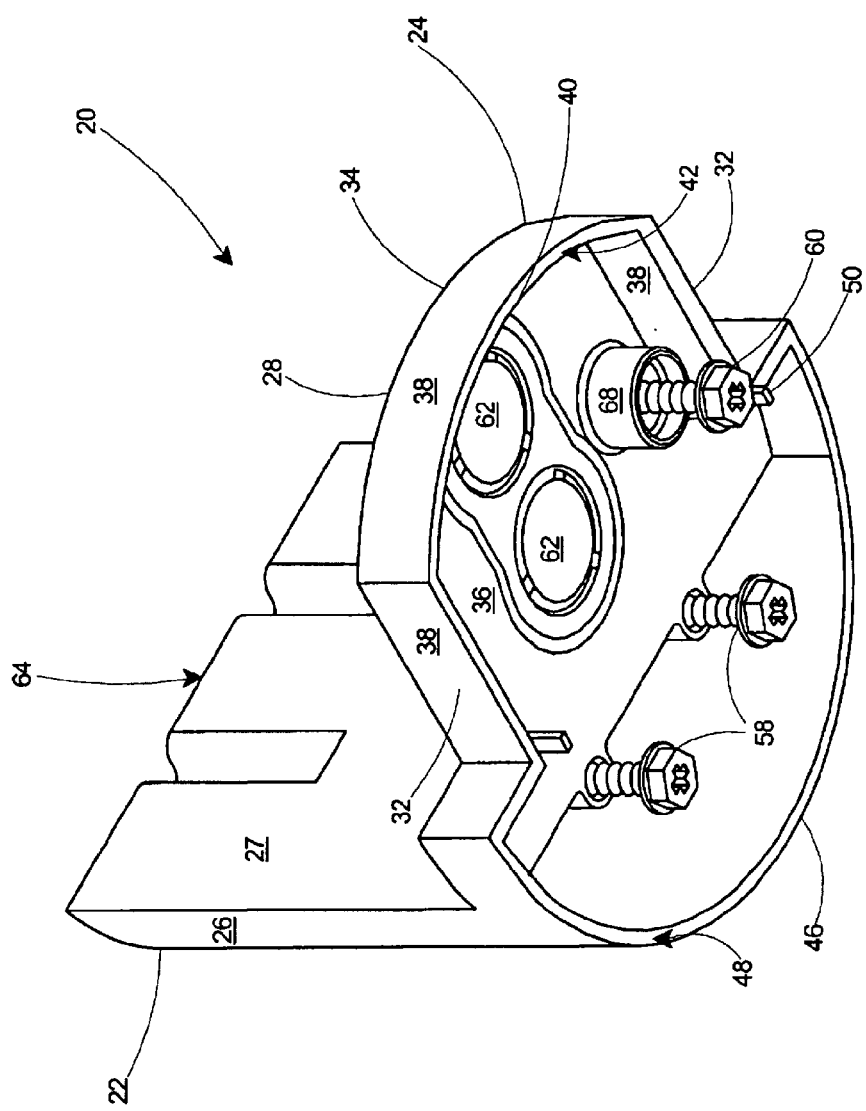
FIG. 1 is a perspective view of the L-shaped mounting assembly of the present invention.

The following is a listing of part numbers used in the drawings along with a brief description:

| Part Number | Description |
| --- | --- |
| 20 | prepackaged mounting assembly |
| 22 | first junction box |

-continued

| Part Number | Description |
| --- | --- |
| 24 | second junction box |
| 26 | arcuate side wall of first junction box |
| 27 | flat side wall of first junction box |
| 28 | top of second junction box |
| 32 | opposing sides of second junction box |
| 34 | distal end |
| 36 | lower surface of top |
| 38 | side walls of second junction box |
| 40 | first arcuate flange |
| 40A | circular flange portion |
| 42 | lower edge of first arcuate flange |
| 46 | second arcuate flange |
| 46A | circular flange portion |
| 48 | lower edge of second arcuate flange |
| 50 | alignment post |
| 52 | holster |
| 54 | tubular projection |
| 56 | inner surface |
| 58 | load bearing fastener |
| 60 | initial fastener |
| 62 | removable wall sections or knockouts |
| 64 | top of first junction box |
| 66 | fitting |
| 68 | boss |
| 70 | interior volume |
| 72 | shallow cavity |
| 74 | deep cavity |
| 76 | wide bore |
| 78 | mouth |
| 80 | narrow bore |
| 82 | plane |
| 84 | point |
| 86 | top surface |
| 96 | beam |
| 98 | bracket |
| 100 | longitudinal slots |
| 102 | seat |
| 103 | threaded bore |
| 104 | center of mounting assembly |
| 106 | circular outer periphery |
| 108 | sheet rock |

DETAILED DESCRIPTION

The present invention is a prepackaged mounting assembly for mounting a suspended electrical fixture from an overhead beam and is especially adapted for a retrofit application, in which the ceiling is finished.

With reference to FIG. 1, a preferred embodiment is shown of the prepackaged mounting assembly 20 which includes a first 22 and a second 24 junction box integrally formed in one piece. The first junction box 22 has deep side walls including an arcuate side wall 26 and a flat side wall 27. The second junction box 24 includes a top 28 that is integral with and extends orthogonally from the flat side wall 27 of the first junction box 22.

Figure 2:
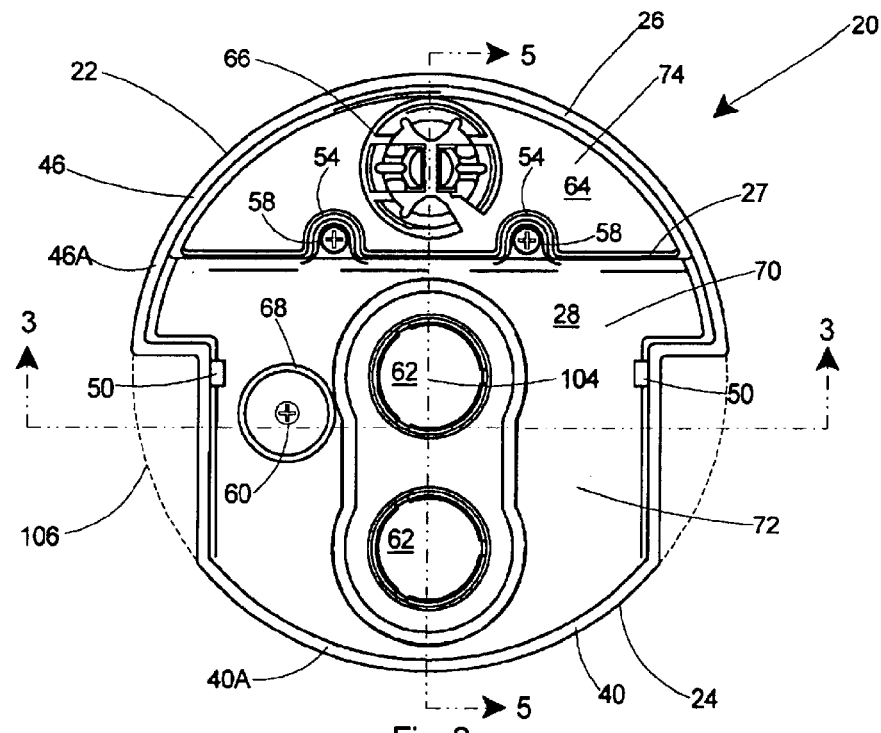
FIG. 2 is a bottom view of the mounting assembly of FIG. 1.

Referring to FIGS. 1 and 2, the top 28 of the second junction box 24 includes two opposing sides 32, a distal end 34, and a lower surface 36. Integral side walls 38 extend downward from the lower surface 36 of the top 28 along the distal end 34 and along the opposing sides 32 of the second junction box 24. The side walls 38 of the second junction box 24 at the distal end 34 form a first arcuate flange 40 having a lower edge 42 ending in a common plane with the side walls 38 of the opposing sides 32. A second arcuate flange 46 projects from the first junction box 22 and a portion of the top 28 of the second junction box 24 and includes a lower edge 48. The lower edge 42 of the first arcuate flange 40 is coplanar with the lower edge 48 of the second arcuate flange 46. Two alignment posts 50 extend downward from the side walls 38 of the second junction box 24 at each of the opposing sides 32.

Figure 3:
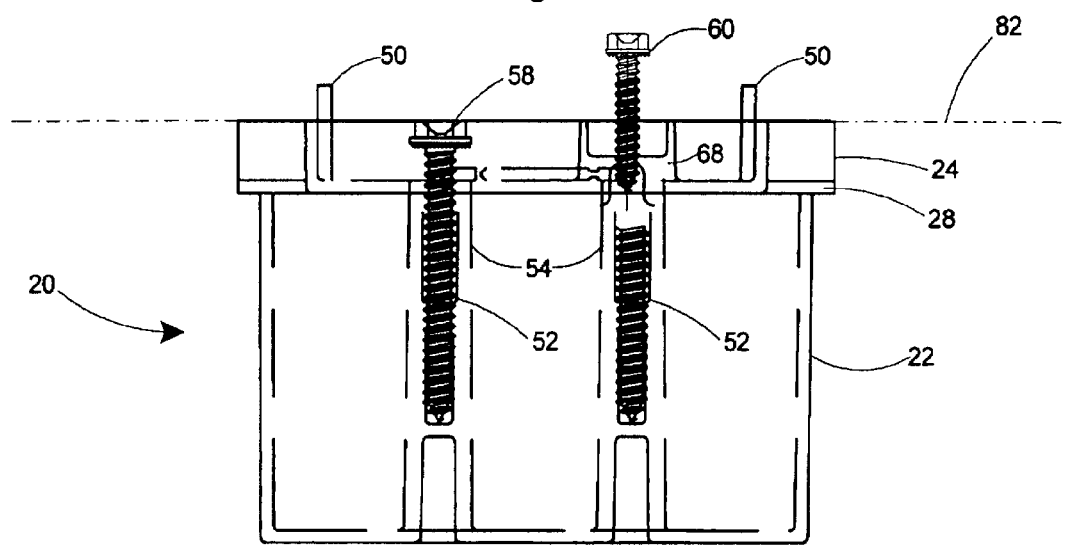
FIG. 3 is a conceptual sectional view of the mounting assembly taken along line 3—3 of FIG. 2 and omitting the mounting box walls to show the relative positions of the initial fastener and load bearing fasteners in the mounting assembly.

With reference to FIG. 3, the prepackaged mounting assembly 20 includes two holsters 52 consisting of tubular projections 54 integral with the inner surface 56 of the flat side wall 27 of the first junction box 22. Each holster 52 includes a load bearing fastener 58 frictionally engaged therein for temporary storage with said prepackaged mounting assembly 20 prior to installation. The prepackaged mounting assembly also includes an initial fastener 60 frictionally engaged in the top 28 of the second junction box 24.

As shown in FIG. 2, one or more removable wall sections 62 or knockouts may be included in either the arcuate side wall 26 or top 64 of the first junction box 22 or in the top 28 of the second junction box 24. A snap in fitting such as the Black Button™ available from Arlington Industries, Inc., 1 Stauffer Industrial Place, Scranton, Pa., may be inserted in one or more of the knockouts 62 such as the fitting 66 shown in the top 64 of the first junction box 22.

As shown in FIG. 2, the load bearing fasteners 58 and the initial fastener 60 are easily accessible from the bottom of the mounting assembly 20 as the tubular projections 54 which hold the load bearing fasteners 58 and the boss 68 which holds the initial fastener 60 are positioned well within the side walls 26, 27 of the first junction box 22 and the side walls 38 of the second junction box 24. The first arcuate flange 40 and second arcuate flange 46 cooperate to form opposing circular flange portions 40A and 46A. The opposing circular flange portions 40A and 46A and the side walls 38 of the second junction box 24 define an interior volume 70 therein. The interior volume 70 includes the shallow internal cavity 72 of the second junction box 24 and the deep cavity 74 of the first junction box 22.

Referring to FIGS. 3 and 6, the load bearing fasteners 58 are held in their temporary storage positions in the holsters 52. The holsters 52 consist of tubular projections 54 integral with the inner walls of the first junction box 22. As shown in FIG. 6, the tubular projections 54 include a wide bore 76 at the mouth 78 and a narrow bore 80 further within. The wide bore 76 is larger than the major thread diameter of the load bearing fastener 58, the narrow bore 80 is smaller than the major thread diameter, and both bores include smooth interior walls. Threads are formed by the load bearing fastener 58 in the narrow bore 80 portion of the tubular projections 54 as the load bearing fasteners 58 are axially advanced therein. After being threaded into the holsters 52, the load bearing fasteners 58 are held securely therein for shipment and storage and are easily accessible and removable when required at installation. As shown in FIG. 3, the load bearing fasteners 58 in temporary storage in the holsters 52 do not extend beyond a plane 82 connecting the coplanar arcuate flanges 40 and 46.

The initial fastener 60 is securely held in its boss 68 for shipment and storage. As shown in FIG. 7, the boss 68 is integral with the top 28 of the second junction box and with the initial fastener 60 inserted therein for shipment and storage the point 84 of the initial fastener 60 does not extend beyond the top surface 86 of the top 28.

Figure 4:
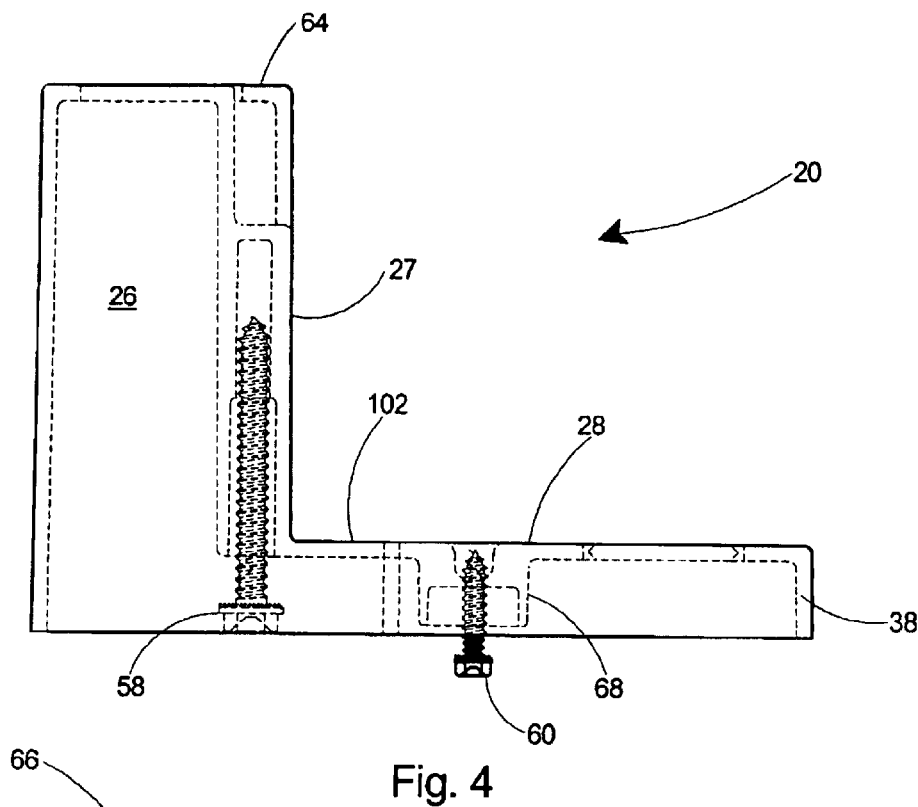
FIG. 4 is a side view of the mounting assembly of FIG. 1.
Figure 5:
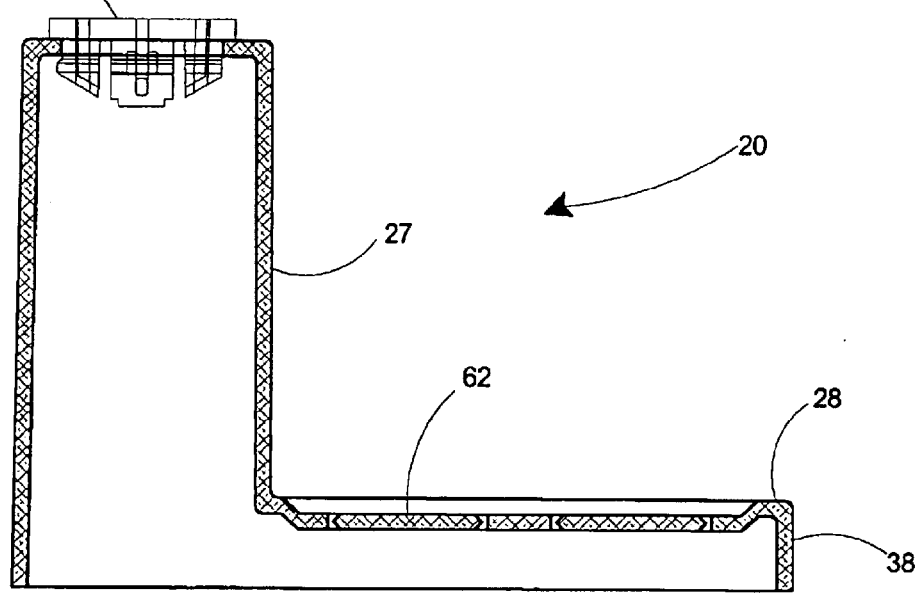
FIG. 5 is a sectional view of the mounting assembly taken along line 5—5 of FIG. 2.

With reference to FIG. 4, it should be noted that the top 28 of the second junction box 24, being orthogonal to the flat side wall 27 of the fist junction box 22, forms a seat 102 thereon for flush placement against an overhead beam 96.

Figure 8:
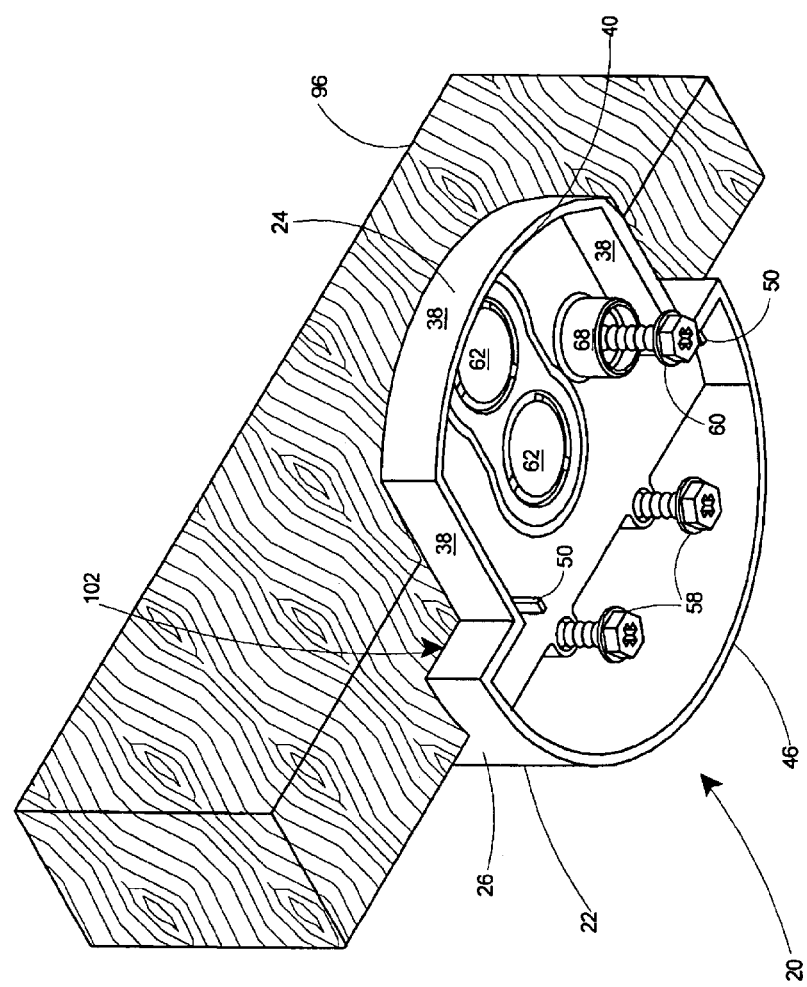
FIG. 8 is a perspective view of the mounting assembly of FIG. 1 after it has been initially mounted on a support beam by the initial mounting fastener and with the load bearing fasteners seated in their holsters.
Figure 9:
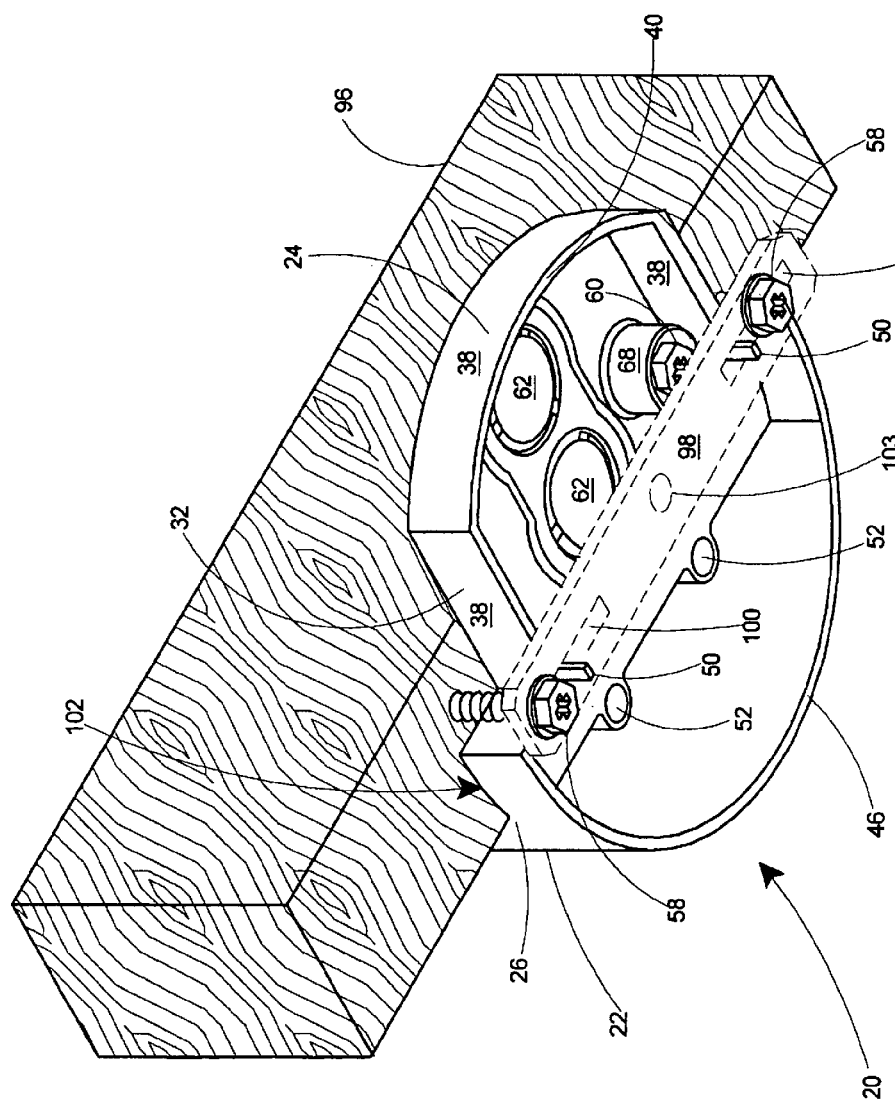
FIG. 9 is a perspective view of the mounting assembly of FIG. 1 after being secured to a support beam by load bearing fasteners driven through the separately supplied bracket.
Figure 10:
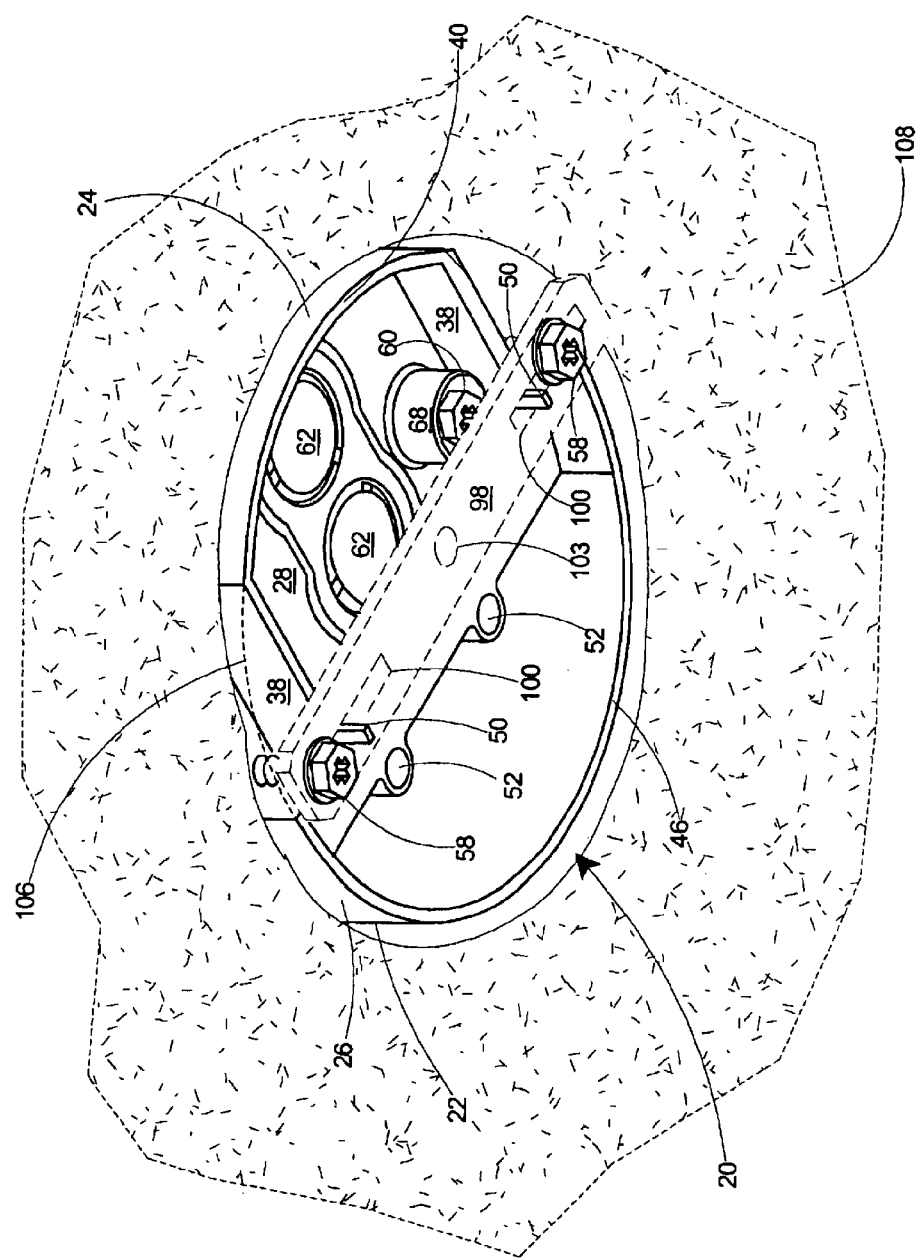
FIG. 10 is a perspective view of the mounting assembly of FIG. 1 after being secured to a support beam in a retrofit situation, wherein a circular portion of the sheet rock has been removed to expose the overhead beam.

For operation of the prepackaged mounting assembly 20, the reader is referred to FIGS. 8–10. FIG. 8 depicts the prepackaged mounting assembly 20 placed against the beam 96 with the load bearing fasteners 58 held securely in the holsters 52, which is the position they are in for shipment and storage of the mounting assembly. As shown in FIG. 8, the prepackaged mounting assembly 20 is placed against the beam 96 such that the seat 102 including the flat side (not shown) and top 28 of the second junction box 24 are flush against the beam 96. The initial fastener 60 is then advanced axially into the beam 96 thereby securing the prepackaged mounting assembly 20 to the beam 96.

FIG. 9 depicts the initial fastener 60 fully advanced axially into the beam 96. It should be noted that the purpose of the initial fastener 60 is to hold the mounting assembly 20 in place thereby freeing the installer's hands. The bracket 98, which is typically supplied separately by the manufacturer with the electrical fixture, is then lifted upwards until the longitudinal slots 100 are fitted upon the alignment posts 50, as shown in FIG. 9. It should be noted that the alignment posts 50 have a width less than that of the longitudinal slots 100. Preferably the alignment posts 50 are between 0.15 and 0.20 inch in width and even more preferably 0.18 inch in width. The alignment posts 50 are preferably between 2.6 and 3.5 inches apart measured between their outer sides and most preferably are 3.11 inches apart. These critical dimensions of the alignment posts 50 permit them to accommodate a wide range of brackets commonly supplied by manufacturers with their electrical devices.

The load bearing fasteners 58 are then removed from their temporary storage positions in the holsters 52, as shown in FIG. 8, and placed outside of the side walls 38 of the second junction box 24, through the longitudinal slots 100 of the bracket 98, and advanced axially into the overhead beam 96 as depicted in FIG. 9. to securely fasten the bracket 98 and prepackaged mounting assembly 20 to the overhead beam 96. It should be noted that the alignment posts 50 and second junction box 24 are of a size to position the load bearing fasteners 58 outside of the opposing sides 32 of the second junction box 24. This insures that all of the weight of the fixture (not shown) eventually suspended from the bracket 98 is supported by the beam 96 and not by the prepackaged mounting assembly 20.

The bracket 98 is typically supplied with an arrangement for attaching the electrical device (not shown) such as a threaded bore 103, as shown in FIG. 9. After the prepackaged mounting assembly 20 is secured to the beam 96 by the load bearing fasteners 58 as shown in FIG. 9, the installer can then hang a device from the threaded bore 103 and, once the weight of the electrical device is supported by the bracket 98, complete wiring connections between the supply and device.

The first 22 and second junction boxes 24 of the prepackaged mounting assembly of the present invention are preferably molded in one piece from plastic. An especially preferred material of construction is polycarbonate, although they could be molded of other elastomeric materials.

As shown in FIG. 2, the first 40 and second 46 arcuate flanges are at the same radius from the center 104 of the mounting assembly 20 thereby giving the assembly a circular outer periphery 106. All portions of the mounting assembly 20 are bounded laterally by the circular outer periphery 106 and no portions extend laterally beyond the circular outer periphery.

The prepackaged mounting assembly 20 therefore is especially useful in a retrofit situation, such as shown in FIG. 10, in which the ceiling, sheet rock 108 or other planar material covering the beams, is finished. To install the mounting assembly, an installer simply uses a hole saw to cut a circular hole in the ceiling 108 at the appropriate place to expose an overhead rafter or beam. The prepackaged mounting assembly 20, having a circular outer periphery 106, is then lifted through the hole and the seat 102 (not shown) pressed against the beam. The initial fastener 60, bracket 98, and load bearing fasteners 58 are then installed in sequence as described previously. The side walls 38 of the second junction box are preferably 0.5 inch in depth. Therefore, with the sheet rock 108 cut away and the mounting assembly 20 tightly secured to the overhead beam 96, as shown in FIG. 10, the lower end of the first 40 and second 46 arcuate flanges are substantially coplanar with the bottom surface of the surrounding sheet rock 108.

The prepackaged mounting assembly of the present invention provides flexibility by supporting a wide range of fixtures of the type that include a mounting bracket. It has the advantage of providing a mounting assembly that can be easily mounted to an existing finished ceiling, in which sheet rock or other material covers the overhead rafters. The prepackaged mounting assembly further provides the advantage that all of the required hardware for mounting the electrical fixture is included with the assembly. The possibility of mistakes from using a fastener that is inadequate for supporting the intended load is thereby minimized. By including all the fasteners temporarily secured in storage locations within the assembly, the prepackaged mounting assembly minimizes the chance that an installer will lose a critical fastener. By freeing the installer's hands, there is much less chance of a fastener being dropped. By locating the load bearing fasteners inside the interior volume of the assembly for shipment and storage, the fasteners are thereby protected during shipment and storage and facilitate ease of packaging. Inclusion of the alignment posts provides an arrangement for quickly aligning a manufacturer's bracket for proper installation of load bearing fasteners into the supporting beam. The prepackaged mounting assembly furthermore provides a large cavity for wiring connections. The prepackaged mounting assembly of the present invention provides the advantage of holding the cover and fasteners securely enough to permit storage, shipping, display, and handling without the need for an outer wrap or separate packaging to retain the cover and fasteners with the assembly.

As the invention has been described, it will be apparent to those skilled in the art that the same may be varied in many ways without departing from the spirit and scope of the invention. Any and all such modifications are intended to included within the scope of the appended claims.

What is claimed is:

1. A prepackaged mounting assembly for use with a separately supplied bracket having longitudinal slots therein, said prepackaged mounting assembly comprising:
   A) a first junction box having deep side walls;
   B) a second junction box having a top integral with and extending orthogonally from a first side of said first junction box;
   C) said top having two opposing sides, a distal end, and a lower surface;
   D) said second junction box including integral side walls extending downward from said lower surface of said top along said distal end and along said opposing sides;
   E) said side walls of said second junction box at said distal end forming a first arcuate flange having a lower edge;
   F) said deep side walls of said first junction box including a second arcuate flange having a lower edge;
   G) said lower edge of said first arcuate flange coplanar with said lower edge of said second arcuate flange; and
   H) alignment posts extending downward from said side walls of said second junction box at each of said opposing sides.

2. The prepackaged mounting assembly of claim 1 wherein said first and second arcuate flanges form a circular outer periphery on said assembly.

3. The prepackaged mounting assembly of claim 1 wherein said alignment posts are smaller than said slots of said bracket.

4. The prepackaged mounting assembly of claim 1 which further includes
   A) at least one holster included in said first junction box; and
   B) a load bearing fastener frictionally engaged in said holster for temporary storage with said prepackaged mounting assembly prior to installation, said load bearing fastener capable of being removed from said holster and repositioned through said slots in said bracket for mounting a fixture to said prepackaged mounting assembly.

5. The prepackaged mounting assembly of claim 4 wherein said first and said second arcuate flanges cooperate to form opposing circular flange portions.

6. The prepackaged mounting assembly of claim 5 wherein said opposing circular flange portions and said side walls of said second junction box define an interior volume therein.

7. The prepackaged mounting assembly of claim 6 wherein said load bearing fastener in said holster is located inside said interior volume and is placed outside of said side walls of said second junction box for repositioning through said slots of said bracket.

8. The prepackaged mounting assembly of claim 4 wherein said holster comprises a tubular projection integral with an inner surface of said deep side walls of said first junction box.

9. The prepackaged mounting assembly of claim 8 including
   A) a major thread diameter on said load bearing fastener;
   B) an internal bore in said tubular projection;
   C) a mouth at the entrance of said internal bore;
   D) a tube interior opposite said mouth; and
   E) said internal bore wider than said major thread diameter at said mouth and narrowing to less than said major thread diameter at said tube interior.

10. The prepackaged mounting assembly of claim 9 wherein said tube interior includes smooth walls.

11. The prepackaged mounting assembly of claim 10 wherein said load bearing fastener form threads when axially advanced into said tube interior.

12. The prepackaged mounting assembly of claim 11 wherein said load bearing fastener in said temporary storage in said holster does not extend beyond a plane connecting said second arcuate flange with said coplanar first arcuate flange.

13. The prepackaged mounting assembly of claim 1 wherein said first side of said first junction box and said top of said second junction box form a seat thereon for flush placement against an overhead beam.

14. The prepackaged mounting assembly of claim 13 wherein said bracket is placed on said circular flange in such a manner that said alignment posts extend through said slots.

15. The prepackaged mounting assembly of claim 14 further including an initial fastener in said top, said initial fastener located below said seat whereby said initial fastener may be tightened into said beam to initially secure said prepackaged mounting assembly to said beam.

16. The prepackaged mounting assembly of claim 1 wherein said first and second junction boxes are molded in one piece.

17. The prepackaged mounting assembly of claim 16 wherein said first and second junction boxes are constructed of polycarbonate.

18. The prepackaged mounting assembly of claim 1 wherein said alignment post is between 0.15 and 0.20 inch width.

19. The prepackaged mounting assembly of claim 1 wherein said alignment posts have inner and outer sides with said alignment posts between 2.6 and 3.5 inches apart measured between said outer sides.

20. The prepackaged mounting assembly of claim 1 including one or more removable wall sections in said deep side walls of said first junction box and in said top of said second junction box.

* * * * *